(12) United States Patent  
Sinha et al.

(10) Patent No.: US 9,961,407 B2  
(45) Date of Patent: May 1, 2018

(54) METHOD AND SYSTEM FOR TELEVISION PROGRAM RECOMMENDATION

(71) Applicant: TATA CONSULTANCY SERVICES LIMITED, Mumbai (IN)

(72) Inventors: Priyanka Sinha, Kolkata (IN); Amit Kumar Agrawal, Kolkata (IN); Chirabrata Bhaumik, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days. days.

(21) Appl. No.: 14/345,644

(22) PCT Filed: Sep. 25, 2012

(86) PCT No.: PCT/IN2012/000639  
§ 371 (c)(1),  
(2) Date: Mar. 18, 2014

(87) PCT Pub. No.: WO2013/072931  
PCT Pub. Date: May 23, 2013

(65) Prior Publication Data  
US 2015/0074722 A1   Mar. 12, 2015

(30) Foreign Application Priority Data  
Sep. 30, 2011   (IN) .......................... 2784/MUM/2011

(51) Int. Cl.  
*H04N 21/482*   (2011.01)  
*H04N 21/442*   (2011.01)  
(Continued)

(52) U.S. Cl.  
CPC ... *H04N 21/4826* (2013.01); *H04N 21/44222* (2013.01); *H04N 21/466* (2013.01);  
(Continued)

(58) Field of Classification Search  
None  
See application file for complete search history.

(56) References Cited

U.S. PATENT DOCUMENTS 7,444,660 B2   10/2008   Dudkiewicz  
9,398,350 B1 *   7/2016   Ong ..................... G06F 17/3082  
(Continued)

OTHER PUBLICATIONS

Kari Jaaskelainen/ Publication Series of the University of Art and Design Helsinki, Finland, "Strategic Questions in the Development of Interactive Television Programs" Sep. 7, 2001 (189 pages).  
(Continued)

*Primary Examiner* — Omar S Parra  
(74) *Attorney, Agent, or Firm* — Finnegan, Henderson, Farabow, Garrett & Dunner LLP

(57) ABSTRACT

The application provides a method and system for automatically recommending television program to a user. The application provides a method and system for recommending related television programs while viewing video on internet based, using context of the said video. Further, the application provides a method and system for extracting electronic program guide information for all the channels available on the television and correlating them for recommending related television programs.

8 Claims, 3 Drawing Sheets

(51) Int. Cl.
  *H04N 21/466* (2011.01)
  *H04N 21/643* (2011.01)
  *H04N 21/8405* (2011.01)

(52) U.S. Cl.
  CPC ... *H04N 21/4668* (2013.01); *H04N 21/64322* (2013.01); *H04N 21/8405* (2013.01)

(56) References Cited

U.S. PATENT DOCUMENTS

| | | |
|---|---|---|
| 2003/0208755 A1 | 11/2003 | Zimmerman |
| 2006/0020973 A1 | 1/2006 | Hannum et al. |
| 2006/0212906 A1 | 9/2006 | Cantalini |
| 2007/0250863 A1 | 10/2007 | Ferguson |
| 2008/0163307 A1 | 7/2008 | Coburn et al. |
| 2008/0271078 A1* | 10/2008 | Gossweiler et al. ............ 725/40 |
| 2010/0186041 A1* | 7/2010 | Chu et al. ........................ 725/46 |
| 2010/0293576 A1* | 11/2010 | Hnyk .................... H04N 7/163 725/41 |
| 2011/0047513 A1 | 2/2011 | Onogi et al. |
| 2011/0066674 A1 | 3/2011 | Piepenbrink et al. |
| 2012/0124630 A1* | 5/2012 | Wellen ............... H04N 21/4334 725/109 |

OTHER PUBLICATIONS

Mukesh Nathan, Chris Harrison, Svetlana Yarosh, Loren Terveen, Larry Stead and Brian Amento, "CollaboraTV: making television viewing social again" uxTV'08, Oct. 22-24, 2008, Silicon Valley, California, USA (pp. 85-94).

Byeng-Hee Chang, Seung-Eun Lee, and Yang-Hwan Lee, " Devising Video Distribution Strategies via the Internet:Focusing on Economic Properties of Video Products" The International Journal on Media Management, 6(1&2), Jun. 22, 2011 (pp. 36-45).

W. Klippgen, T.D.C. Little, G. Ahanger, and D. Venkatesh, "The Use of Metadata for the Rendering of Personalized Video Delivery," MCL Technical Report Dec. 1, 1996 (31 pages).

* cited by examiner

METHOD AND SYSTEM FOR TELEVISION PROGRAM RECOMMENDATION

PRIORITY CLAIM

This application is a National Stage Entry under 35 U.S.C. § 371 of International Application No. PCT/IN2012/000639, titled "A METHOD AND SYSTEM FOR TELEVISION PROGRAM RECOMMENDATION," filed Sep. 25, 2012, which claims the benefit of India Application No. 2784/MUM/2011, titled "A METHOD AND SYSTEM FOR TELEVISION PROGRAM RECOMMENDATION," filed on Sep. 30, 2011, both of which are incorporated herein in their entirety by reference for all purposes.

FIELD OF THE APPLICATION

The present application relates to television broadcasting and infotainment. Particularly, the application relates to a method and system for recommending related television programs while viewing video on internet.

DEFINITIONS

As used in this specification the following words are generally intended to have a meaning as set forth below, except to the extent that the context in which they are used indicate otherwise.

EPG: Electronic program guide (EPG) provide users of television, radio, and other media applications with continuously updated menus displaying broadcast programming or scheduling information for current and upcoming programming.

BACKGROUND OF THE INVENTION

Recent times have witnessed tremendous growth in internet and broadcasting arena. Television, being a conventional medium of audio visual broadcasting, has been widely accepted as an ample source of entertainment for the viewers. In similar line, internet technologies have been successfully fulfilling the growing demand of information dissemination along with the entertainment of an individual. Increasing network of internet has converted a significant percentage of television viewership into internet beneficiary as well.

A viewer in general uses television and internet separately for satisfying respective needs. Since, there is no such technological intersection where both the internet and television can be utilized in complementary manner for enhanced viewer experience. In particular, it is extremely difficult to find out television programs having significant relevancy with videos on internet. Hence it becomes inevitable to formulate a method which shall help the viewers to consume the confluence of internet and television.

In the current scenario, lots of efforts have been made to develop various approaches to address the problem of non-confluence of internet and television. Most of the generic approaches do not associate television programs directly with videos on internet, in particular. Thereby it reduces the seamless integration of internet and television. Most of the current research work concentrates on extracting context from broadcast programs first and accordingly fetching data from the internet. Prior arts also describe about a simple keyword based search approach to find out videos related to television program, wherein the program title and REST APIs are used. The reverse process of searching relevant television programs using videos is not trivial. However, such a searching approach has not been attempted, which requires correlation of keywords related to video and electronic program guide data and that may also utilize other online resources. Thus it becomes extremely necessary to provide a solution to associate television programs with videos on the internet, allowing the recommendation of television channels and programs to the viewer, while watching video on internet.

In order to recommend related television programs to a user while the user is viewing video on internet, a method and system is required which could utilize the video context and electronic programme guide to suggest the closely related television programs.

However, the existing methods and systems are not capable of providing a solution that utilizes the context of video on internet, using the metadata of such videos and electronic programme guide to suggest closely related television programs, while viewing video on the internet. Some of the known methods described by relevant prior art are as follows:

US2011066674A to Piepenbrink et al. teaches a method and system for recommending multimedia content which includes collecting consumption information of a plurality of consumers. The patent application does not teach about recommending television programs utilizing the internet video context by using the metadata of internet videos and electronic programme guide US2008163307A to Coburn et al. teaches a system for accessing entertainment options including a graphic user interface generator that generates program listing display data that includes a listing of programs available for downloading to a user on an associated display device. The patent application does not teach about recommending television programs utilizing the internet video context by using the metadata of internet videos and electronic programme guide US2007250863A to Ferguson teaches a method and system for the control, aggregation, and management of television programming and Internet content. The patent application does not teach about recommending television programs utilizing the internet video context by using the metadata of internet videos and electronic programme guide US2006212906A to Cantalini teaches a system and method for receiving, navigating, selecting and viewing data on handheld wireless communication devices and/or internet browsers. The patent application does not teach about recommending television programs utilizing the internet video context by using the metadata of internet videos and electronic programme guide US2006020973A to Hannum et al. teaches a novel electronic program guide (EPG) based method and system that provides viewer/user groups with an improved program recommendation feature for predicting programs that are likely to be of interest. The patent application does not teach about recommending television programs utilizing the internet video context by using the metadata of internet videos and electronic programme guide US2003208755A to Zimmerman teaches a method and system for providing conversational recommendations while viewing television programs. The patent application does not teach about recommending television programs utilizing the internet video context by using the metadata of internet videos and electronic programme guide Hessey et al. in "How can recommendations be presented to TV viewers?" teaches about testing the presentation of recommended items to viewers in a variety of ways to establish best and worst features, and to inform user interface design decisions of future IPTV recommendations services.

Cesar et al. in "Usages of the Secondary Screen in an Interactive Television Environment: Control, Enrich, Share, and Transfer Television Content" teaches about a number of techniques and services around a unifying concept, the secondary screen.

Jaaskelainen in "Strategic Questions in the Development of Interactive Television Programs" teaches about identifying strategy for developing interactive television programs.

Nathan et al. in "CollaboraTV: making television viewing social again" teach about a system called CollaboraTV which supports the communal viewing experience through a month-long field study.

Cesar in "Social Sharing of Television Content: An Architecture" teaches about an architecture that enhances this social link by supporting micro-personal recommendation messages of television content.

Hyoseop et al. in "Personalized digital TV content recommendation with integration of user behavior profiling and multimodal content rating" teaches about an embedded system that aims at digital TV content recommendation based on descriptive metadata collected from versatile sources.

Chang et al. in "Devising Video Distribution Strategies via the Internet: Focusing on Economic Properties of Video Products" teach about linking economic properties of video products to strategies that can be used by Internet-based video distributors.

Klippgen et al. in "The Use of Metadata for the Rendering of Personalized Video Delivery" teach about investigating techniques for personalizing information delivery based on metadata associated with diverse information units including video.

The above mentioned prior arts fail to disclose an efficient method and system for recommending related television programs while viewing video on internet using context of said video. The prior arts also fail to disclose about a method and system which could utilize the video context by using the metadata of video and electronic programme guide for facilitating seamless integration of internet and television.

Thus, in the light of the above mentioned background art, it is evident that, there is a long felt need for such a solution that can provide an effective method and system for recommending related television programs while viewing video on internet using context of said video. There is also a need for such a solution which could utilize the video context by using the metadata of video on internet and electronic programme guide to suggest the closely related television programs, while viewing video on internet.

OBJECTIVES OF THE APPLICATION

The primary objective of the present application is to provide a method and system for recommending related television programs while viewing video on internet using context of the said video.

Another objective of the application is to enable a method and system for utilizing the context of video on internet using the metadata of video on internet and electronic programme guide to suggest the closely related television programs, while viewing video on internet in order to facilitate seamless integration of internet and television.

Another objective of the application is to enable a method and system for recommending television programs based on viewing of videos on the internet from video sharing websites such as YouTube for bringing relevant programs from the broadcast world for facilitating seamless integration of internet and television.

Yet another objective of the application is to enable a method and system for extracting detailed electronic program guide information for next few hours for all the channels available on the television.

SUMMARY OF THE APPLICATION

Before the present methods, systems, and hardware enablement are described, it is to be understood that this application in not limited to the particular systems, and methodologies described, as there can be multiple possible embodiments of the present application which are not expressly illustrated in the present disclosure. It is also to be understood that the terminology used in the description is for the purpose of describing the particular versions or embodiments only, and is not intended to limit the scope of the present application which will be limited only by the appended claims.

The present application provides a method and system for recommending related television programs while viewing video on internet using context of said video. A method and system is provided for utilizing the context of video on internet by using the metadata of the video on internet and electronic programme guide to suggest the closely related television programs, while viewing video on internet for facilitates seamless integration of internet and television.

In an aspect of the application a method and system is provided for recommending related television channels and programs based on viewing of videos on the internet from video sharing websites such as YouTube for bringing relevant programs from the broadcast world for facilitating seamless integration of internet and television. The present invention enables a method and system for extracting detailed electronic program guide information for next few hours for all the channels available on the television.

The said method and system are preferably a method and system for recommending related television programs while viewing video on internet using context of the said video but also can be used for many other applications, which may be obvious to a person skilled in the art.

BRIEF DESCRIPTION OF DRAWINGS

The foregoing summary, as well as the following detailed description of preferred embodiments, are better understood when read in conjunction with the appended drawings. For the purpose of illustrating the application, there is shown in the drawings exemplary constructions of the application; however, the application is not limited to the specific methods and system disclosed. In the drawings.

DETAILED DESCRIPTION OF THE APPLICATION

Figure 1:
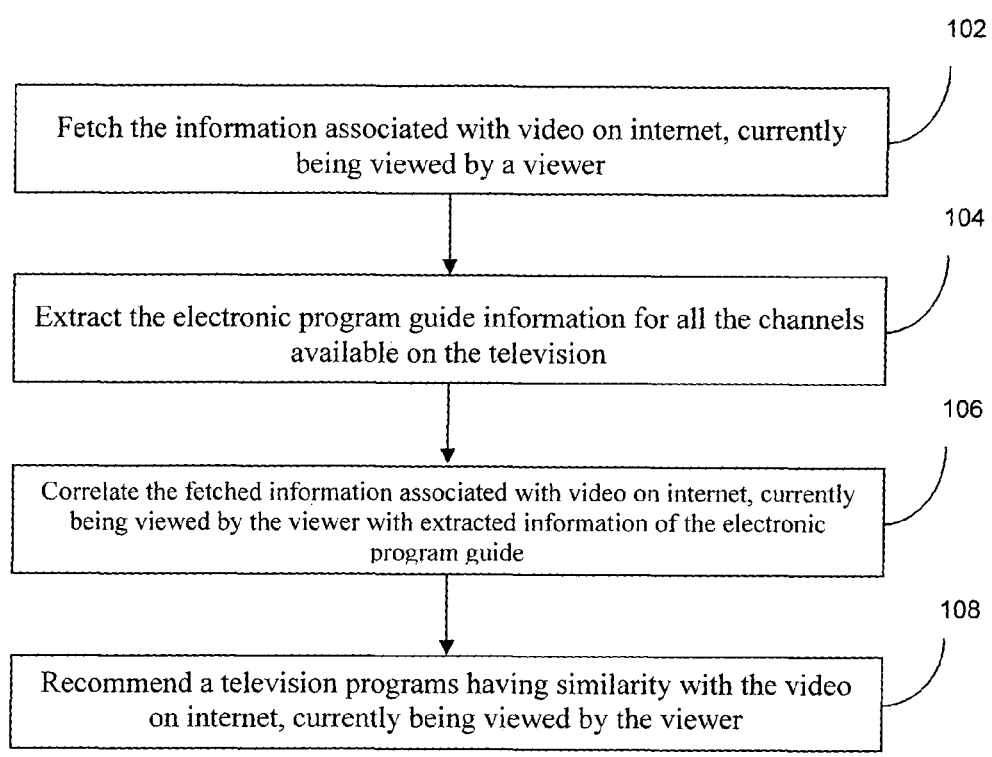
FIG. 1 shows flow diagram of the process for recommending related television program.

Some embodiments of this application, illustrating all its features, will now be discussed in detail.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present application, the preferred, systems and methods are now described.

The disclosed embodiments are merely exemplary of the application, which may be embodied in various forms.

The present application provides a method for automatically recommending television program to a user whereby information associated with video on internet is extracted and correlated with extracted electronic program guide information.

The present application provides a system for automatically recommending television program to a user, the system comprising of at least one broadcaster (302); at least one processing unit (202); at least one display unit (204); at least one input unit (304); and at least one server (306), wherein the broadcaster (302) is employed for broadcasting the audio-visual content; the processing unit (202) is adapted to fetch information associated with internet based video currently being viewed by a viewer; extract electronic program guide information for all the channels available on the television; and correlate the fetched information associated with internet based video currently being viewed by the viewer and extracted information of the electronic program guide for recommending television programs having similarity with the internet based video currently being viewed by the viewer; the display unit (204) is electronically and communicatively coupled with the processing unit (202) employed to screen; the input unit (304) is electronically and communicatively coupled with the processing unit (202) and the display unit (204) facilitating the viewer to provide input for the viewing preferences; and the server (306) is adapted to load analytical processing output of the processing unit (202).

Referring to FIG. 1, a flow diagram of the process for recommending related television program is illustrated.

The process starts at the step 102, information associated with video on internet, which is currently being viewed by a viewer is fetched. At the step 104, electronic program guide information is extracted for all the channels available on the television. At the step 106, the fetched information associated with video on internet, which is currently being viewed by the viewer is correlated with extracted information of the electronic program guide. The process ends at the step 108, a television programs having similarity with the video on internet, which is currently being viewed by the viewer, is recommended.

Figure 2:
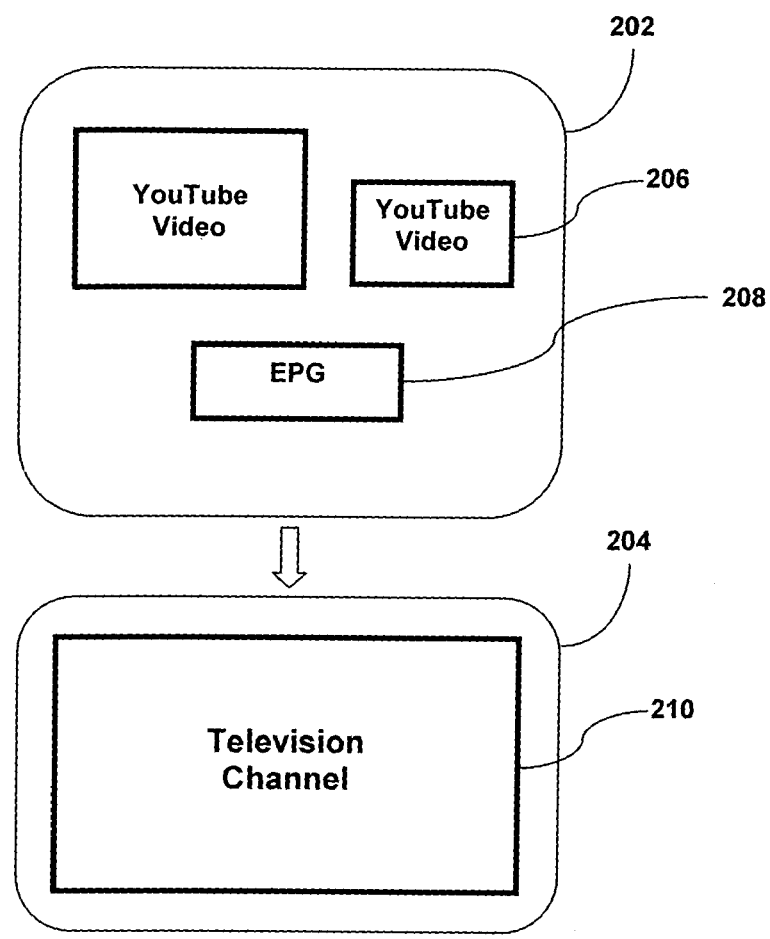
FIG. 2 shows block diagram illustrating state transition from YouTube video page to television channel.

Referring to FIG. 2, a block diagram illustrating state transition from YouTube video page to television channel is illustrated.

The present invention utilizes internet video context from the internet video sharing websites such as YouTube, and further analyze the video context and electronic program guide (EPG) to find related television programs for recommends related television program while viewing internet video for facilitates seamless integration of internet and television.

In an embodiment of the invention, a display unit (204) is electronically and communicatively coupled with a processing unit (202). A television screen may be used as the display unit (204), wherein a viewer may visualize television channel (210) according to the viewing preferences. A YouTube video (206) is being played on the display unit (204). There may be several other related videos of said YouTube Videos available. The YouTube video (206) may contain several keywords as annotated by uploader or the other viewers. The invention utilizes a method for fetching the information such as keywords, categories, related videos, geographical details, ratings associated with currently playing YouTube video (206) or any internet video for an example. The present method utilizes google API to create a customized view of YouTube video (206) mashed up with a way to tune into television program corresponding to the television channels related to the video on internet currently being viewed by the viewer.

An electronic program guide (EPG) (208), may contain a complete list of viewer subscribed television channels. The detailed electronic program guide (208) information may be extracted for next few hours for all the television channels (210) available on the display unit (204).

The YouTube video (206) and the electronic program guide (208) are correlated, wherein, in the related videos list, related television programs are listed with their corresponding airing television channel(s) (210). The method suggests the television programs with highest similarity to currently viewed Youtube video (206). The suggestion is an indicative one and relations are extracted by using textual metadata available from YouTube video (206) or any other internet videos and electronic program guide (208). When the viewer clicks on the related/corresponding television channel, this information is instantly sent to the set top box connected to the display unit (204) and it tunes to said related/corresponding television channel. The tuning or setting of a reminder takes into account the restrictions due to the geolocation of the viewer as well as parental control settings.

Figure 3:
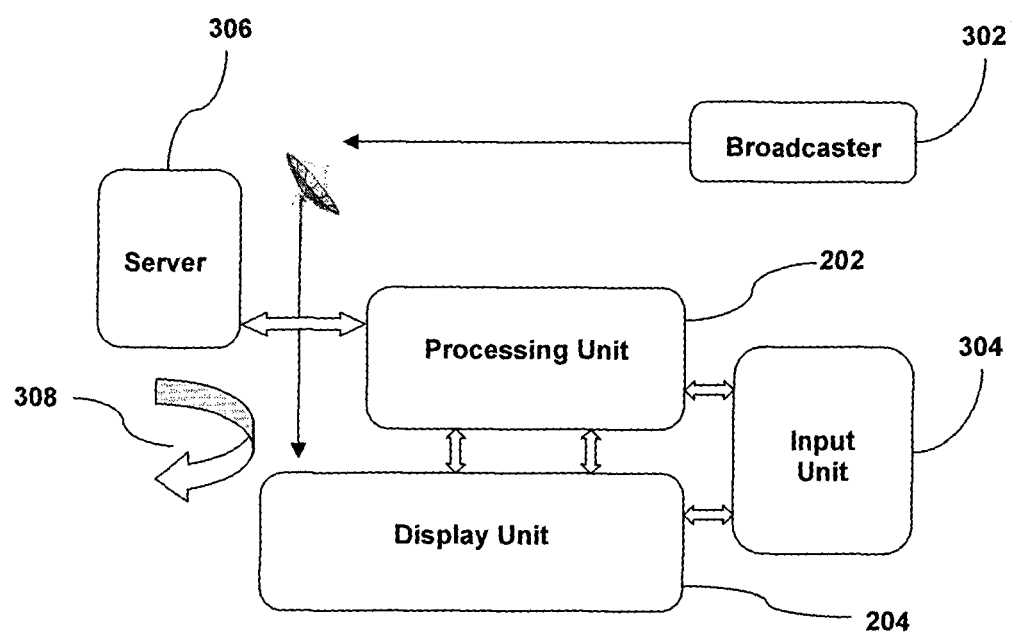
FIG. 3 shows a block diagram illustrating system architecture.

FIG. 3 is a block diagram illustrating system architecture.

In an embodiment of the invention, the process of recommending television programs may be implemented using the system architecture illustrated in FIG. 3. The television feeds or broadcasts are available from broadcaster (302), which a viewer can visualize directly on the display unit (204), wherein a television screen may be used as the display unit (204).

The display unit (204) is electronically and communicatively coupled with the processing unit (202). The processing unit (202) and display unit (204) are electronically and communicatively coupled with the input unit (304) facilitating the viewer to provide input for the viewing preferences. The processing unit (202) is communicatively coupled with the internet (308) and may be employed to offload analytical processing output of the processing unit (202) to a server (306). The display unit (204) is a logical unit which may screen both video on internet as well as television channels, or only television channels.

The methodology and techniques described with respect to the exemplary embodiments can be performed using a machine or other computing device within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The machine may include a processor (e.g., a central processing unit (CPU), a graphics processing unit (GPU, or both), a main memory and a static memory, which communicate with each other via a bus. The machine may further include a video display unit (e.g., a liquid crystal displays (LCD), a flat panel, a solid state display, or a cathode ray tube (CRT)). The machine may include an input device (e.g., a keyboard) or touch-sensitive screen, a cursor control device (e.g., a mouse), a disk drive unit, a signal generation device (e.g., a speaker or remote control) and a network interface device.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

The preceding description has been presented with reference to various embodiments. Persons skilled in the art and technology to which this application pertains will appreciate that alterations and changes in the described structures and methods of operation can be practiced without meaningfully departing from the principle, spirit and scope.

We claim:

1. A method for automatically recommending a television program to a user, comprising:

obtaining, by one or more hardware processors using programmed instructions stored in a memory, metadata associated with a video on Internet comprising one or more keywords, one or more categories, one or more related videos, geographical details, and ratings associated with the video, wherein the video being currently viewed by the user;

extracting, by the one or more hardware processors, textual metadata from electronic program guide information with respect to one or more television channels subscribed by the user, wherein the electronic program guide information is maintained in the memory, and wherein the electronic program guide information is associated with television programs broadcasted over the one or more television channels subscribed by the user;

correlating, by the one or more hardware processors, the metadata associated with the video on Internet comprising the one or more keywords, the one or more categories, the one or more related videos, the geographical details, and the ratings associated with the video with the textual metadata from the electronic program guide information to find related television programs;

recommending, by the one or more hardware processors, the related television programs having a degree of similarity with the video currently being viewed by the user, and wherein the related television programs are broadcasted over the one or more television channels subscribed by the user, and generating, by the one or more hardware processors and the display unit, a customized view of the video on the display unit, wherein the customized view of the video being used to tune into one or more television channels of the recommended television programs while viewing the video on internet to facilitate seamless integration of the internet and television.

2. The method as claimed in claim 1, further comprising generating a customized view of the video, the customized view of the video being used to tune into a television channel of the one or more television program.

3. The method as claimed in claim 1, further comprising enabling the user to set a reminder or tune to a channel of the recommended one or more television programs.

4. A system for automatically recommending a television program to a user, the system comprising:

a display unit which is electronically and communicatively coupled with a processing unit, wherein the display unit being configured to display one or more television programs based on the recommendation;

a processing unit having one or more hardware processors; and a memory storing processor-executable instructions comprising instructions that, when executed by the one or more processors, cause the one or more processors to:

obtain metadata associated with a video on Internet comprising one or more keywords, one or more categories, one or more related videos, geographical details, and ratings associated with the video, wherein the video being currently viewed by the user;

extract textual metadata from electronic program guide information with respect to one or more television channels subscribed by the user, wherein the electronic program guide information is maintained in the memory, and wherein the electronic program guide information is associated with television programs broadcasted over the one or more television channels subscribed by the user;

correlate the metadata associated with the video on Internet comprising the one or more keywords, the one or more categories, the one or more related videos, the geographical details, and ratings associated with the video with the textual metadata from the electronic program guide information to find related television programs;

recommending the related television programs having a degree of similarity with the video currently viewed by the user, and wherein the related television programs are broadcasted over the one or more television channels subscribed by the user, and generating a customized view of the video on the display unit, wherein the customized view of the video being used to tune into one or more television channels of the recommended television programs while viewing the video on internet to facilitate seamless integration of the internet and television.

5. The system as claimed in claim 4, wherein the processor is configured to receive audio-visual content broadcasted by a broadcaster.

6. The system as claimed in claim 5, wherein the audio-visual content comprises at least one of Internet-based videos and television channel broadcast.

7. The system as claimed in claim 4, further comprising an input unit that is electronically and communicatively coupled with the processing unit and the display unit, the input unit facilitating the user to provide viewing preferences.

8. The system as claimed in claim 4, wherein the instructions to cause the one or more processors to correlate the obtained information associated with the video with the extracted electronic program guide information is based on available textual metadata associated with the video and the electronic program guide information.

* * * * *